April 4, 1961 R. E. LODERHOSE Re. 24,962

RECORD JACKET WITH DETACHABLE PHOTOGRAPHS

Original Filed June 25, 1958

INVENTOR.

Richard E. Loderhose

BY Irving Seidman

ATTORNEY

United States Patent Office

Re. 24,962
Reissued Apr. 4, 1961

24,962

RECORD JACKET WITH DETACHABLE PHOTOGRAPHS

Richard E. Loderhose, 84—25 Radnor St., Jamaica Estates, N.Y.

Original No. 2,931,557, dated Apr. 5, 1960, Ser. No. 744,525, June 25, 1958. Application for reissue July 22, 1960, Ser. No. 44,826

7 Claims. (Cl. 229—70)

Matter enclosed in heavy brackets [ ] appears in the original patent but forms no part of this reissue specification; matter printed in italics indicates the additions made by reissue.

This invention relates to phonograph record jackets or envelopes and, more particularly, to a novel record jacket or envelope having on the face thereof an easily detachable picture of the recording artist or artists.

The jackets or envelopes of many records comprise an essentially square envelope of cardboard or the like covered with one or more layers of paper glued thereto, the outer layer of paper being "slick" paper, i.e. having a glossy finish. This outer layer is imprinted, in black and white or in color, with information including the title or titles of the recordings on the record. Quite frequently, this outer layer is imprinted with a picture of the recording group or the individual artist, and sometimes the artist's picture carries an autograph.

It so happens that fans, particularly in the younger age groups, like to collect pictures of their favorite recording stars, particularly where these pictures carry an autograph of the star. As a result, it is a quite common expedient to cut or otherwise remove such pictures from a record jacket or envelope. As the outer layer of glossy paper imprinted with the picture is firmly adhered to the underlying material of the record jacket, it is difficult to remove the picture intact from the jacket and, when removal of this type is attempted, the picture may be torn or otherwise damaged. Consequently, the more common expedient is to cut the picture carrying section out of the wall of the jacket, thus leaving a relatively large opening exposing a record placed in the jacket. From the standpoint of record protection, this procedure destroys the usefulness of the record jacket.

In accordance with the present invention, these difficulties are avoided and the record protecting integrity of the jacket is maintained by providing a picture carrying section, of the outer paper covering of the jacket, which section is not adhered to the underlying material of the jacket but is attached along perforated tear lines to marginal portions of the outer paper covering which are adhered to the underlying material of the jacket. As removal of the picture normally would expose the relatively unsightly underlying cardboard or paper board of the jacket, an underlying layer of glossy material may be disposed beneath the removable picture section and adhered to the cardboard or paperboard in the usual manner. Thereby, when the picture is removed, the jacket will still have a complete outer covering of glossy or "slick" paper. If desired, such underlying layer of paper may be imprinted in the same manner as the removable outer section so that the appearance of the jacket remains unchanged when the outer picture section is torn out along the perforated tear outline.

For an understanding of the invention principles, reference is made to the following description of typical embodiments thereof as illustrated in the accompanying drawings. In the drawings.

Figure 1:
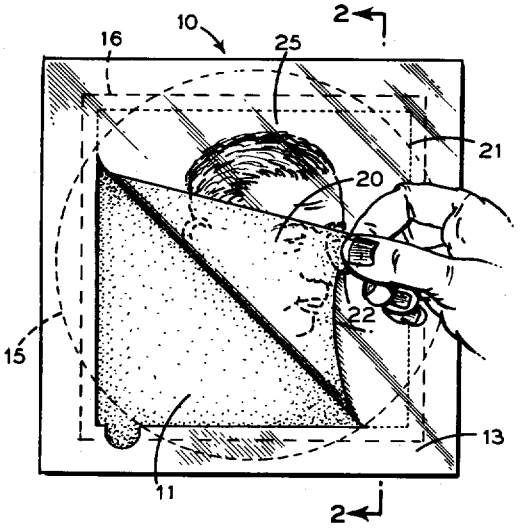
Fig. 1 is a plan view of one embodiment of a record jacket incorporating the invention.
Figure 2:
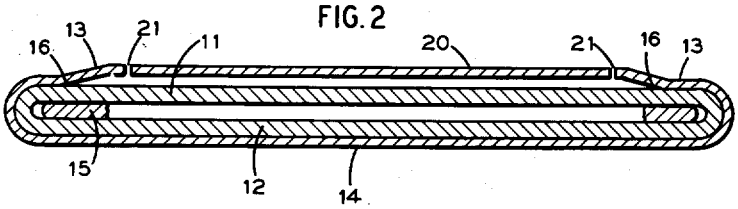
Fig. 2 is a sectional view on the line 2—2 of Fig. 1.

Referring to Figs. 1 and 2, a record jacket 10 is illustrated as comprising an underlying cardboard or paperboard envelope having a front wall 11 and a rear wall 12. The envelope may be formed by folding a single piece of cardboard or paperboard on itself and suitably uniting two of the three free edges of each section to each other to leave an opening for inserting a record 15 into the envelope.

In accordance with the usual practice, the outer surface of the cardboard or paperboard envelope is covered with a layer of "slick" or glossy paper providing a front wall 13 and a rear wall 14. Rear paper wall 14 is glued or otherwise adhered over its entire surface to the outer surface of wall 12.

In accordance with the invention, front paper wall 13 is provided with a removable picture section 20 defined by a perforated tear outline 21. To allow easy removal of section 20, front paper wall 13 adhered or glued to wall 11 only adjacent its margin, the gluing or pasting terminating at a line 16 parallel to and spaced a suitable distance, such as ¼", from tear line 21. Section 20 is not adhered to wall 11 and is completely free thereof, being held in position only by its perforated tear line attachment to the marginal portions of front paper wall 13.

Removable section 20 is imprinted with a picture 25 of the recording artist or artists, and may carry one or more autographs. To facilitate removal of section 20, a starter tab 22 is provided, and may be easily lifted by a fingernail or thumb nail to start tearing out of section 20 along tear outline 21.

It will be noted that, in the embodiment of Figs. 1 and 2, when section 20 is removed, the surface of the underlying cardboard or paperboard wall 11 is exposed, which may give an unsightly appearance to jacket 10. To avoid this, the embodiment of Figs. 3 and 4 may be used. As this embodiment is similar in most respects to that of Figs. 1 and 2, the same reference characters primed have been used to designate like parts.

Figure 3:
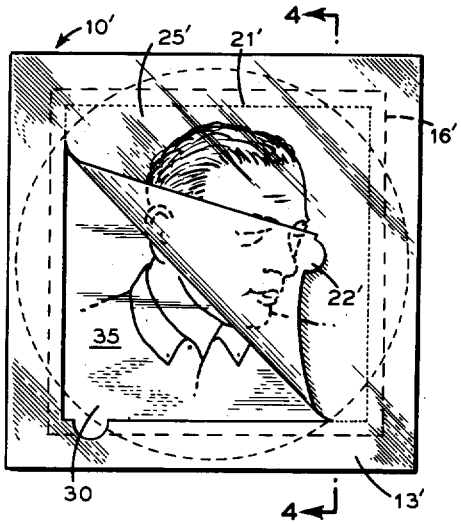
Fig. 3 is a plan view of another embodiment of a record jacket incorporating the invention.
Figure 4:
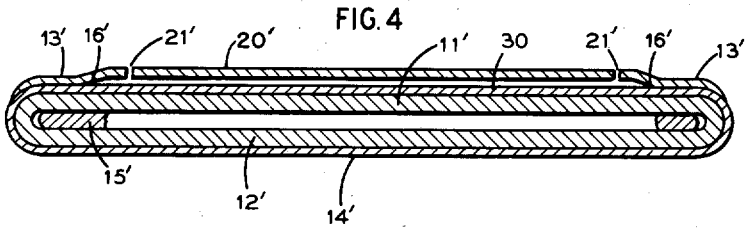
Fig. 4 is a sectional view on the line 4—4 of Fig. 3.

Jacket 10' of Figs. 3 and 4 differs from jacket 10 of Figs. 1 and 2 in that an underlying layer 30 of "slick" or glossy paper is surface-to-surface adhered to cardboard or paperboard front wall 11 beneath removable section 20'. Layer 30 is somewhat larger than section 20' in both lateral dimensions, so that layer 30 extends marginally beyond tear outline 21'. The adhering of outer glossy paper wall 13' to layer 30 terminates at glue line 16', so that section 20' is completely free of layer 30.

When section 20' is removed, layer 30 is exposed and covers wall 11'. Layer 30 may be imprinted with a picture 35 of the artist or artists, and this picture may be identical to picture 25'. Hence, the appearance of jacket 10' is not substantially altered when section 20' is removed.

While specific embodiments of the invention have been shown and described in detail to illustrate the application of the invention principles, it will be understood that the invention may be embodied otherwise without departing from such principles.

What is claimed is:

1. A phonograph record jacket comprising, in combination, an envelope of relatively rough and stiff base material and including a front wall and a rear wall; and a layer of glossy finish paper covering the outer surfaces of said envelope and including a front wall and a rear wall; the rear paper wall being adhered over substantially all of its surface to the rear wall of the base material envelope;

the front paper wall having a removable section therein defined by a perforated tear outline and being adhered to the envelope only along its margin outside said tear outline; said removable section being free of adherence to the envelope for bodily detachment therefrom by tearing along said tear outline and leaving a complete jacket for the record including a complete and imperforate front wall of said base material.

2. A phonograph record jacket as claimed in claim 1 in which the adherence of said front paper wall to said envelope terminates at a line substantially parallel to and spaced outwardly of said tear outline.

3. A phonograph record jacket as claimed in claim 1 in which the outer surface of said removable section is imprinted with a picture of the recording artist or artists.

4. A phonograph record jacket as claimed in claim 1 including a layer of slick paper underlying said removable section and adhered in surface-to-surface engagement to said base material front wall.

5. A phonograph record jacket as claimed in claim 4 in which said underlying layer of slick paper extends marginally beyond said tear outline.

6. A phonograph record jacket as claimed in claim 4 in which said underlying layer of slick material is imprinted on its outer surface with the same imprinting as on the outer surface of said removable section.

*7. A multi-wall container, one wall of which comprises a front panel and a backing panel, said front panel having a removable section therein defined by a perforated tear outline, said backing panel having a printed section, said backing panel underlying said front panel and having its marginal edges only adhered to the marginal edges of said front panel outside of said tear outline, said removable section overlying said printed section of said backing panel and being free of adherence to said backing panel for bodily detachment from said container by tearing along said tear outline leaving a complete and imperforate backing panel.*

References Cited in the file of this patent or the original patent

UNITED STATES PATENTS

| | | |
|---|---|---|
| 2,628,619 | Froehlig | Feb. 17, 1953 |

FOREIGN PATENTS

| | | |
|---|---|---|
| 6,148 | Great Britain | Mar. 15, 1909 |
| 35,703 | Switzerland | Nov. 8, 1905 |
| 404,515 | Great Britain | Jan. 18, 1934 |